United States Patent Office 3,577,455
Patented May 4, 1971

3,577,455
t-BUTYL-α-METHYL-γ-NITRO VALERATE
Robert E. Jones, North Muskegon, Mich., and Harold Reynolds, Kankakee, Ill., assignors to Merck & Co., Inc., Rahway, N.J.
No Drawing. Filed Feb. 10, 1966, Ser. No. 526,369
Int. Cl. C07c *69/24, 69/66, 103/08*
U.S. Cl. 260—478                                                    1 Claim

ABSTRACT OF THE DISCLOSURE t-Butyl-α-methyl-γ-nitro valerate useful as an intermediate in the preparation of a levulinic acid derivative which is useful in the preparation of non-steroidal anti-inflammatory agents.

---

This invention is concerned with novel processes for the preparation of substituted and unsubstituted levulinic acid and derivatives thereof. More particularly it is concerned with the preparation of unsubstituted and alpha-substituted levulinic acids, nitriles, amides and esters. It is concerned also with valuable intermediates prepared and utilized in the process.

Levulinic acid is generally prepared by the acetoacetic ester synthesis. The reactions may be illustrated as follows:

[CH$_3$COCH$_2$COO Alk] Na + CH$_2$Cl COO Alk ⟶

CH$_3$COCH—COO Alk   H$_2$O ⟶ CH$_3$COCH$_2$CH$_2$COOH
          |                          + H$^+$
     CH$_2$COO Alk

This reaction has been unsatisfactory principally due to the cost of the starting acetoacetic ester. In addition it lacks flexibility since only the acid can be prepared and it is not applicable to the preparation of alpha-substituted compounds. In contrast the process of this invention is applicable not only to the production of alpha-substituted compounds but also to the preparation of carboxylic acid derivatives such as nitriles, amides and esters. Moreover, the starting materials are relatively inexpensive.

Levulinic acid and its derivatives prepared by the process of this invention comprise a known class of compounds useful in a variety of applications. They are useful for example, in the preparation of non-steroidal anti-inflammatory agents such as methyl α-[1-(p-chlorobenzoyl)-2-methyl-5-methoxy-3-indolyl]-propionate and N-aroyl or heteroaroyl 3-indolyl lower aliphatic acid analogs thereof in which the aroyl or heteroaroyl group contains less than three fused rings.

In one method for the preparation of these useful compounds, a levulinic acid ester such as benzyl alpha-methyl levulinate is condensed with a phenylhydrazine such as p-methyl phenylhydrazine, preferably as an acid addition salt such as the hydrochloride to produce an indole, in this case benzyl α-(2,5-dimethyl-3-indolyl) propionate. The indole derivative may then be acylated with an aroyl or heteroaroyl halide of the defined class by treatment with an alkali metal hydride e.g. sodium hydride to form a sodium salt which is then reacted with the selected aroyl or heteroaroyl acid halide in an anhydrous solvent medium.

Compounds so prepared are valuable for their high degree of anti-inflammatory activity and because of their effectiveness in the prevention and inhibition of granuloma tissue formation.

Among the many useful compounds which may be prepared in accordance with this invention are included, for example, compounds which may be represented by the formula.

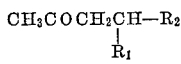

wherein R$_1$ is hydrogen, fluorine, alkyl or substituted alkyl containing up to six carbon atoms including, for example, halogen substituted alkyl groups such as halomethyl, especially trifluoromethyl, and R$_2$ is cyano; carboxy; carbamide, including mono- and di-lower alkyl substituted carbamides such as N-methyl-carbamide, N,N-diethylcarbamide and N,N-dibutyl carbamide; or carbalkoxy or carbaralkoxy containing up to eight carbon atoms such as carbomethoxy, carbo-t-butoxy, carbobenzyloxy or carbo-p-methylbenzyloxy.

The presently preferred processes of this invention may be illustrated by the following alternative reaction Sequences A and B in which R$_1$ and R$_2$ have the same meaning as above, M is an alkali metal and R is lower alkyl. Compounds represented by Formulas I and II are novel and are specifically included within the purview of this invention.

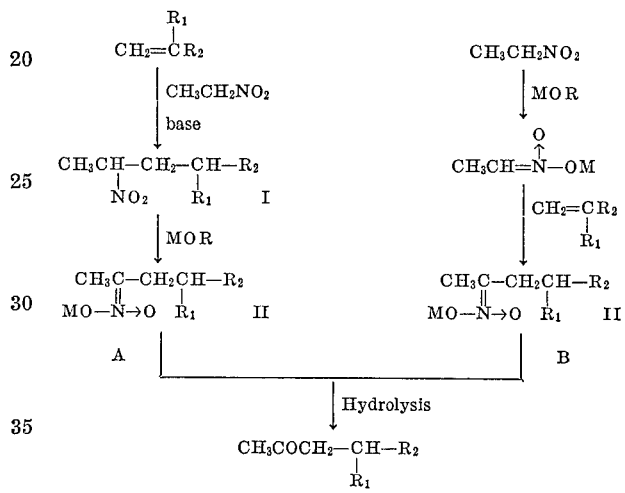

In Sequence A, above, the first step of the synthesis, that is the condensation of nitroethane with the acrylic acid compound is effected under alkaline catalysis. The reactants are mixed in the presence of an alkaline catalyst, preferably a nitrogenous base such as triethylamine or tetraethylguanidine and stirred at about 20° C. to about 40° C., possible with slight cooling for from about 6 to about 25 hours. The amount of catalyst employed may vary within wide limits, for example from about 0.01% to about 1% by weight. A reaction inert solvent may be employed, but it is preferred to use excess nitroethane as the solvent.

The novel nitrovaleric acid compounds thus produced may be isolated in any convenient manner, for example by distillation after neutralization of the catalyst, preferably with a lower alkanoic acid such as acetic or propionic acid.

For conversion to the novel aci salts of this invention, the thus prepared compounds are reacted with an alkaline reagent, preferably an alkali metal hydroxide or lower alkoxide, although salts of alkali metals and weak acids such as sodium acetate or potassium formate may be employed. The reaction is carried out in a polar solvent such as water, lower alkanols or water-lower alkanol mixtures. Suitable alkanols include methanol or ethanol. The formation of the salt is quite rapid and slight cooling may be necessary to control the reaction temperature. It is generally preferred to maintain the reaction temperature at from about 10° C. to about 23° C.

These same aci salts can also be prepared by the reactions illustrated in Sequence B, above. In Sequence B, an alkali metal salt of nitroethane is formed and this compound is condensed with the selected acrylic compound.

The nitroethane salt, for example sodium or potassium nitroethane may be formed by reacting the selected alkali metal lower alkoxide, for example the methoxide or ethoxide with nitroethane in a lower alkanol solvent. It is preferred to utilize methanol with methoxides and ethanol with ethoxides. The reaction is preferably effected by adding the nitroethane to the alkaline solution at a rate such as to maintain the temperature at from about 5° C. to about 15° C. The salt is not isolated but is condensed with the acrylate compound in the medium in which it is formed.

Condensation of the nitroethane salt with the acrylic acid compound is effected by mixing the reactants in the reaction medium still containing a catalytic amount of base. The condensation is a mildly exothermic reaction and may be controlled within the preferred temperature range of from about 35° C. to about 75° C. by external cooling. The condensation is normally complete in about one to five hours.

It may be helpful to add a small amount of an antioxidant such as hydroquinone to the acrylic acid compound as a stabilizing agent, although it is not essential to do so. As little as 0.001% by weight may be useful, but normally from about 0.01% to about 0.1% by weight will be utilized. The nature of the antioxidant is not critical.

In the last step at both Sequence A and B the aci salts of nitrovaleric acid or its derivatives (Formula II) are hydrolyzed to form the levulinic acid compounds. Hydrolysis is effected at low temperature under strongly acidic conditions. The reaction may be carried out for example, by intimately mixing the aci salt with an aqueous mineral acid such as aqueous sulfuric acid containing from about 20% to about 50% acid by weight. The aci salt is preferably added to the hydrolysis medium at a rate consistent with maintaining the temperature at from about —5° C. to about 15° C. The time of reaction is not critical and will depend upon the quantity of reactants.

At the end of the reaction period, the product may be isolated in any convenient manner, for example, by extraction of the reaction mixture using an immiscible solvent, suitably a hydrocarbon or halogenated hydrocarbon solvent containing up to six carbon atoms, followed by removal of the solvent after washing and drying.

The following examples are given by way of illustration only and are not to be considered as limiting this invention:

EXAMPLE I

Methyl-α-methyl levulinate

Sodium methoxide (216 g., 4 M) is dissolved in 860 cc. of methanol and cooled to 10° C. Nitroethane (525 g., 7 M) is added dropwise to the stirred solution to form a slurry of the sodium salt of nitroethane.

To this slurry is added methyl methacrylate (400 g., 4 M) stabilized by the addition of 0.06% by weight of hydroquinone at room temperature. The temperature is raised slowly to reflux and maintained at reflux for 1½ hours. It is then cooled to 20° C. and 100 cc. of water added to clarify the solution.

A mixture containing 2500 g. of ice and 800 cc. of concentrated sulfuric acid is cooled to 10° C. and the solution of the sodium salt of methyl-α-methyl-γ-nitrovalerate prepared as described above, is added dropwise over a period of 2 hours. During the addition the solution changes to a blue color. The acidic mixture is extracted three times with one liter portions of methylene chloride. The combined extracts are washed with 500 cc. of saturated sodium bicarbonate solution and dried over sodium sulfate. The sulfate is then removed and the filtrate distilled at atmospheric pressure. The distillation is continued up to 115° C. to recover unreacted nitroethane. The residue was then vacuum distilled at 10 mm. of mercury at 60–78° C. to obtain the desired product.

The procedure is repeated with the appropriate starting materials to obtain the following compounds:

Levulinic acid
Ethyl α-sec. butyl levulinate
Propyl α-hexyl levulinate
Benzyl α-methyl levulinate
t-Butyl α-methyl levulinate
α-Methyl levulinamide
N-methyl-α-propyl levulinamide
N,N-diethyl-α-methyl levulinamide

EXAMPLE II (A) α-methyl-γ-nitrovaleronitrile 3 moles of nitroethane, 1 mole of methylacrylonitrile and 0.04 mole of tetramethyl guanidine are mixed with slight cooling to maintain the mildly exothermic reaction at about 35° C. The mixture is then stirred at room temperature for 20 hours. The amine is neutralized by the addition of glacial acetic acid and the unreacted materials removed by vacuum distillation to leave a residue from which the desired product is recovered by distillation at 1 mm. of mercury at 72–80° C.

(B) α-methyl levulinonitrile

A mixture containing 11.4 g. (0.08 M) of the product prepared in part A, 10 cc. of alcohol, 6.5 cc. of 34% aqueous sodium hydroxide and 35 mm. of water is cooled and 16 cc. of concentrated sulfuric acid and 50 cc. of water added with stirring while maintaining the temperature at about 10° C. The addition requires approximately 2 hours. The cooling medium is then removed and the solution stirred for an additional ¾ hour. The solution is extracted with three 10 ml. portions of ether and the combined extracts washed successively with 50 ml. portions of saturated aqueous sodium bicarbonate and 50 cc. of water. The organic layer is separated, dried over anhydrous magnesium sulfate filtered, and the solvent removed in vacuo to leave a residue from which the desired product is recovered by distillation at 1 mm. of mercury at 75–83° C.

The procedures of Parts A and B are repeated with the appropriate starting materials to prepare the following compounds:

α-ethyl levulinonitrile
α-isopropyl levulinonitrile
α-amyl-levulinonitrile
α-methyl levulinamide
N-methyl-α-propyl levulinamide
N,N-diethyl-α-methyl levulinamide

EXAMPLE III (A) α-trifluoromethyl-α-nitrovaleramide 4 moles of nitroethane and 1 mole of α-trifluoromethyl acrylamide and 0.05 mole of diethylamine stirred at 40° C. for 10 hours. The catalyst is neutralized by the addition of glacial acetic acid and the desired product recovered as described in Example II part A.

(B) α-trifluoromethyl levulinamide

This product is prepared in accordance with the procedure of Example II part B. It is a crystalline solid with a melting point of 120–125° C.

The following compounds are similarly prepared with the appropriate starting materials.

Methyl α-trifluoromethyl levulinate
Ethyl α-propyl levulinate
p-Methylbenzyl α-ethyl levulinate
Benzyl α-fluoro levulinate
α-fluoro levulinamide
N-propyl α-isopropyl levulinamide
N,N-diethyl α-ethyl levulinamide
α-chloromethyl levulinic acid t-Butyl α-methyl levulinate
Benzyl α-methyl levulinate
α-Methyl levulinic acid

What is claimed is:
1. t-Butyl-α-methyl-γ-nitro valerate.

References Cited

UNITED STATES PATENTS

| | | | |
|---|---|---|---|
| 2,390,918 | 12/1945 | Bruson | 280—478 |
| 2,554,831 | 5/1951 | Kloetzel | 260—478 |
| 2,655,511 | 10/1953 | Woodruff | 260—526 |
| 2,659,751 | 11/1953 | Hass et al. | 260—478 |
| 3,026,352 | 3/1962 | Matthews | 260—526 |

OTHER REFERENCES

Johnson et al., Journal of Organic Chemistry, vol. 8, pp. 10–11 (1943).
Schickh, Chem. Abstracts, vol. 52 (1958), page 5455f.
Forrester et al., J. Chem. Soc., 1965, page 1228.
Isagulyants et al., Chem. Abstracts (1966), page 12542h.

JAMES A. PATTEN, Primary Examiner
V. GARNER, Assistant Examiner

U.S. Cl. X.R.

260—326.13R, 465.1, 465.7, 483, 487, 526S, 539, 561K, 561HL, 999